(12) United States Patent
Orr

(10) Patent No.: US 9,225,584 B1
(45) Date of Patent: Dec. 29, 2015

(54) ALTERNATIVE NETWORK ADDRESS PORT TRANSLATION

(75) Inventor: Michael Orr, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 2440 days.

(21) Appl. No.: 11/345,885

(22) Filed: Feb. 2, 2006

Related U.S. Application Data

(60) Provisional application No. 60/703,347, filed on Jul. 28, 2005.

(51) Int. Cl.
*H04L 29/12* (2006.01)

(52) U.S. Cl.
CPC ............ *H04L 29/12018* (2013.01); *H04L 61/10* (2013.01)

(58) Field of Classification Search
CPC ................... H04L 29/12018; H04L 29/12367; H04L 61/10
USPC ........................................................ 709/249
See application file for complete search history.

(56) References Cited

U.S. PATENT DOCUMENTS

| | | | | |
|---|---|---|---|---|
| 6,567,405 | B1 * | 5/2003 | Borella et al. ................ | 370/389 |
| 7,068,655 | B2 * | 6/2006 | March et al. .................. | 370/392 |
| 2002/0118678 | A1 * | 8/2002 | Hamada ........................ | 370/389 |
| 2003/0142680 | A1 * | 7/2003 | Oguchi ......................... | 370/400 |
| 2003/0149787 | A1 * | 8/2003 | Mangan ........................ | 709/238 |
| 2003/0233475 | A1 * | 12/2003 | Maufer et al. ................ | 709/245 |
| 2004/0044778 | A1 * | 3/2004 | Alkhatib et al. .............. | 709/228 |
| 2004/0098501 | A1 * | 5/2004 | Finn .............................. | 709/236 |
| 2005/0063398 | A1 * | 3/2005 | Choudhury et al. .......... | 370/401 |
| 2005/0144286 | A1 * | 6/2005 | Szu et al. ...................... | 709/227 |
| 2005/0198310 | A1 * | 9/2005 | Kim et al. ..................... | 709/227 |

* cited by examiner

*Primary Examiner* — Joe Chacko

(57) ABSTRACT

An apparatus includes a plurality of network devices to transmit frames of data. Each of the network devices is associated with one or more predetermined transport-layer port numbers that are not associated with any others of the network devices. All of the network devices are associated with a single common predetermined internet protocol (IP) address. Each of the frames of data includes the common predetermined IP address as a source IP address and a respective one of the predetermined transport-layer port numbers as a source transport-layer port number. A switch includes a plurality of first interfaces, each in communication with one of the network devices, to receive the frames of data from the network devices, a second interface to transmit the frames of data from the apparatus, and a forwarding engine to transfer the frames of data from the second interfaces to the first interface.

17 Claims, 11 Drawing Sheets

US 9,225,584 B1

ALTERNATIVE NETWORK ADDRESS PORT TRANSLATION

CROSS-REFERENCE TO RELATED APPLICATIONS

This application claims the benefit of U.S. Provisional Patent Application Ser. No. 60/703,347 filed Jul. 28, 2005, the disclosure thereof incorporated by reference herein in its entirety.

BACKGROUND

The present invention relates generally to data communications. More particularly, the present invention relates to alternative network address and port translation.

Network address translation (NAT) is a technique commonly used to allow multiple network devices to access a network using a single internet protocol (IP) address. For example, conventional routers for small offices and home offices allow multiple computers to access the Internet using a single external IP address by translating between the IP addresses of the computers and the external IP address by monitoring connection parameters such as the destination IP addresses of frames of data sent by the computers. One variation of NAT is network address port translation (NATP), which also employs port mapping.

Both NAT and NATP as conventionally implemented suffer from a significant disadvantage. Because both techniques are generally implemented by a central processing unit (CPU), switching involving NAT or NATP cannot occur at wire speed.

SUMMARY

In general, in one aspect, the invention features an apparatus comprising a plurality of network devices to transmit frames of data, wherein each of the network devices is associated with one or more predetermined transport-layer port numbers that are not associated with any others of the network devices, wherein all of the network devices are associated with a single common predetermined internet protocol (IP) address, and wherein each of the frames of data comprises the common predetermined IP address as a source IP address and a respective one of the predetermined transport-layer port numbers as a source transport-layer port number; and a switch comprising a plurality of first interfaces, each in communication with one of the network devices, to receive the frames of data from the network devices, a second interface to transmit the frames of data from the apparatus, and a forwarding engine to transfer the frames of data from the second interfaces to the first interface.

In some embodiments, the second interface receives further frames of data into the apparatus, wherein each of the further frames of data comprises the common predetermined IP address as a destination IP address and one of the predetermined transport-layer port numbers as a destination transport-layer port number; and the forwarding engine transfers each of the further frames of data to the one of the second interfaces in communication with the network device associated with the destination transport-layer port number of the frame of data, wherein the second interfaces transfer the further frames of data to the network devices. Some embodiments comprise a memory to store associations between the network devices and the predetermined transport-layer port numbers. Some embodiments comprise a processor to generate the associations based on the frames of data. Some embodiments comprise a further network device to receive the frames of data from the switch, and to transmit the further frames of data to the switch.

In general, in one aspect, the invention features an apparatus comprising a plurality of network device means for transmitting frames of data, wherein each of the network device means is associated with one or more predetermined transport-layer port numbers that are not associated with any others of the network device means, wherein all of the network device means are associated with a single common predetermined internet protocol (IP) address, and wherein each of the frames of data comprises the common predetermined IP address as a source IP address and a respective one of the predetermined transport-layer port numbers as a source transport-layer port number; and means for switching comprising a plurality of first interface means, each in communication with one of the network device means, for receive the frames of data from the network device means, second interface means for transmit the frames of data from the apparatus, and forwarding engine means for transferring the frames of data from the second interface means to the first interface means.

In some embodiments, the second interface means receives further frames of data into the apparatus, wherein each of the further frames of data comprises the common predetermined IP address as a destination IP address and one of the predetermined transport-layer port numbers as a destination transport-layer port number; and wherein the forwarding engine means transfers each of the further frames of data to the one of the second interface means in communication with the network device means associated with the destination transport-layer port number of the frame of data, wherein the second interface means transfer the further frames of data to the network device means. Some embodiments comprise memory means for storing associations between the network device means and the predetermined transport-layer port numbers. Some embodiments comprise processor means for generating the associations based on the frames of data. Some embodiments comprise further network device means for receiving the frames of data from the switch means, and for transmitting the further frames of data to the switch means.

In general, in one aspect, the invention features a method comprising associating each of a plurality of network devices with one or more predetermined transport-layer port numbers that are not associated with any others of the network devices; associating all of the network devices with a single common predetermined internet protocol (IP) address; transmitting frames of data from the network devices, wherein each of the frames of data comprises the common predetermined IP address as a source IP address and a respective one of the predetermined transport-layer port numbers as a source transport-layer port number; and switching the frames of data to a network.

Some embodiments comprise receiving further frames of data from the network into the switch, wherein each of the further frames of data comprises the common predetermined IP address as a destination IP address and one of the predetermined transport-layer port numbers as a destination transport-layer port number; and switching each of the frames of data to the one of the network devices associated with the destination transport-layer port number of the frame of data. Some embodiments comprise storing associations between the network devices and the predetermined transport-layer port numbers. Some embodiments comprise generating the associations based on the frames of data.

In general, in one aspect, the invention features a computer program comprising associating each of a plurality of network devices with one or more predetermined transport-layer port numbers that are not associated with any others of the network devices; associating all of the network devices with a single common predetermined internet protocol (IP) address; causing the network devices to transmit frames of data from the network devices, wherein each of the frames of data comprises the common predetermined IP address as a source IP address and a respective one of the predetermined transport-layer port numbers as a source transport-layer port number; and causing a switch to switch the frames of data to a network. In some embodiments, the switch receives further frames of data from the network, wherein each of the further frames of data comprises the common predetermined IP address as a destination IP address and one of the predetermined transport-layer port numbers as a destination transport-layer port number, and the computer program further comprises causing the switch to switch each of the frames of data to the one of the network devices associated with the destination transport-layer port number of the frame of data. Some embodiments comprise storing associations between the network devices and the predetermined transport-layer port numbers. Some embodiments comprise generating the associations based on the frames of data.

In general, in one aspect, the invention features an apparatus comprising a plurality of network devices, wherein each of the network devices is associated with one or more predetermined transport-layer port numbers that are not associated with any others of the network devices, and wherein all of the network devices are associated with a single common predetermined internet protocol (IP) address; and a switch comprising a first interface to receive frames of data into the apparatus, wherein each of the frames of data comprises the common predetermined IP address as a destination IP address and one of the predetermined transport-layer port numbers as a destination transport-layer port number, a plurality of second interfaces, each in communication with a respective one of the network devices, and a forwarding engine to transfer each of the frames of data to the one of the second interfaces in communication with the network device associated with the destination transport-layer port number of the frame of data, wherein the second interfaces transfer the frames of data to the network devices.

In some embodiments, the second interfaces receive second frames of data from the network devices, wherein each of the second frames of data comprises the common predetermined IP address as a source IP address and a respective one of the predetermined transport-layer port numbers as a source transport-layer port number; the forwarding engine transfers each of the second frames of data to the first interface; and the first interface transmits the second frames of data from the apparatus. Some embodiments comprise a memory to store associations between the network devices and the predetermined transport-layer port numbers. Some embodiments comprise a processor to generate the associations based on the frames of data. Some embodiments comprise a further network device to transmit the frames of data to the switch, and to receive the second frames of data from the switch. In some embodiments, the further network device comprises: a processor to execute an application bound to at least one of the predetermined transport-layer port numbers associated with each of the network devices, wherein the application causes the further network device to transmit the frames of data to the switch.

In general, in one aspect, the invention features an apparatus comprising a plurality of network device means, wherein each of the network device means is associated with one or more predetermined transport-layer port numbers that are not associated with any others of the network device means, and wherein all of the network device means are associated with a single common predetermined internet protocol (IP) address; and means for switching comprising first interface means for receiving frames of data into the apparatus, wherein each of the frames of data comprises the common predetermined IP address as a destination IP address and one of the predetermined transport-layer port numbers as a destination transport-layer port number, a plurality of second interface means, each in communication with a respective one of the network device means, and forwarding engine means for transferring each of the frames of data to the one of the second interface means in communication with the network device means associated with the destination transport-layer port number of the frame of data, wherein the second interface means transfer the frames of data to the network device means. In some embodiments, second interface means receive second frames of data from the network device means, wherein each of the second frames of data comprises the common predetermined IP address as a source IP address and a respective one of the predetermined transport-layer port numbers as a source transport-layer port number; the forwarding engine means transfers each of the second frames of data to the first interface means; and the first interface means transmits the second frames of data from the apparatus. Some embodiments comprise memory means for storing associations between the network device means and the predetermined transport-layer port numbers. Some embodiments comprise processor means for generating the associations based on the frames of data. Some embodiments comprise further network device means for transmitting the frames of data to the means for switching, and to receive the second frames of data from the means for switching. In some embodiments, the further network device means comprises processor means for executing an application bound to at least one of the predetermined transport-layer port numbers associated with each of the network devices, wherein the application causes the further network device to transmit the frames of data to the switch.

In general, in one aspect, the invention features a method comprising associating each of a plurality of network devices with one or more predetermined transport-layer port numbers that are not associated with any others of the network devices; associating all of the network devices with a single common predetermined internet protocol (IP) address; receiving frames of data from a network, wherein each of the frames of data comprises the common predetermined IP address as a destination IP address and a respective one of the predetermined transport-layer port numbers as a destination transport-layer port number; and switching each of the frames of data to the one of the network devices associated with the destination transport-layer port number of the frame of data.

Some embodiments comprise transmitting second frames of data from the network devices, wherein each of the second frames of data comprises the common predetermined IP address as a source IP address and a respective one of the predetermined transport-layer port numbers as a source transport-layer port number; and switching the frames of data to a network. Some embodiments comprise storing associations between the network devices and the predetermined transport-layer port numbers. Some embodiments comprise generating the associations based on the frames of data. Some embodiments comprise transmitting the frames of data to the switch from a further network device, and receiving the second frames of data into the further network device from the switch. Some embodiments comprise executing an application at the further network device that binds to at least one of the predetermined transport-layer port numbers associated with each of the network devices, wherein the application causes the further network device to transmit the frames of data to the switch.

In general, in one aspect, the invention features a computer program for an apparatus, the computer program comprising associating each of a plurality of network devices with one or more predetermined transport-layer port numbers that are not associated with any others of the network devices; associating all of the network devices with a single common predetermined internet protocol (IP) address; wherein the apparatus receives frames of data from a network, wherein each of the frames of data comprises the common predetermined IP address as a destination IP address and a respective one of the predetermined transport-layer port numbers as a destination transport-layer port number; and switching each of the frames of data to the one of the network devices associated with the destination transport-layer port number of the frame of data.

Some embodiments comprise causing the network devices to transmit second frames of data, wherein each of the second frames of data comprises the common predetermined IP address as a source IP address and a respective one of the predetermined transport-layer port numbers as a source transport-layer port number; and switching the frames of data to a network. Some embodiments comprise storing associations between the network devices and the predetermined transport-layer port numbers. Some embodiments comprise generating the associations based on the frames of data.

In general, in one aspect, the invention features an apparatus comprising: a plurality of network devices, wherein each of the network devices is associated with a different predetermined network device identifier, and wherein all of the network devices are associated with a single common predetermined internet protocol (IP) address; and a switch comprising a first interface to receive frames of data into the apparatus, wherein each of the frames of data comprises the common predetermined IP address as a destination IP address and an application-layer header comprising one of the network device identifiers, a plurality of second interfaces, each in communication with a respective one of the network devices, and a forwarding engine to transfer each of the frames of data to the one of the second interfaces in communication with the network device associated with the network device identifier in the frame of data, wherein the second interfaces transfer the frames of data to the network devices.

In some embodiments, the second interfaces receives second frames of data from the network devices, wherein each of the second frames of data comprises the common predetermined IP address as a source IP address and an application-layer header comprising a respective one of the network device identifiers; the forwarding engine transfers each of the second frames of data to the first interface; and the first interface transmits the second frames of data from the apparatus. Some embodiments comprise a memory to store associations between the network devices and the network device identifiers. Some embodiments comprise a processor to generate the associations based on the frames of data. Some embodiments comprise a further network device to transmit the frames of data to the switch, and to receive the second frames of data from the switch.

In general, in one aspect, the invention features an apparatus comprising: a plurality of network device means, wherein each of the network device means is associated with a different predetermined network device identifier, and wherein all of the network device means are associated with a single common predetermined internet protocol (IP) address; and means for switching comprising first interface means for receiving frames of data into the apparatus, wherein each of the frames of data comprises the common predetermined IP address as a destination IP address and an application-layer header comprising one of the network device identifiers, a plurality of second interface means, each in communication with a respective one of the network devices, and forwarding engine means for transferring each of the frames of data to the one of the second interface means in communication with the network device means associated with the network device identifier in the frame of data, wherein the second interface means transfer the frames of data to the network device means.

In some embodiments, the second interface means receives second frames of data from the network device means, wherein each of the second frames of data comprises the common predetermined IP address as a source IP address and an application-layer header comprising a respective one of the network device identifiers; the forwarding engine means transfers each of the second frames of data to the first interface means; and the first interface means transmits the second frames of data from the apparatus. Some embodiments comprise memory means for storing associations between the network device means and the network device identifiers. Some embodiments comprise processor means for generating the associations based on the frames of data. Some embodiments comprise further network device means for transmitting the frames of data to the means for switching, and to receive the second frames of data from the means for switching.

In general, in one aspect, the invention features a method comprising: associating all of a plurality of network devices with a different predetermined network device identifier; associating all of the network devices with a single common predetermined internet protocol (IP) address; receiving frames of data from a network, wherein each of the frames of data comprises the common predetermined IP address as a destination IP address and an application-layer header comprising one of the network device identifiers; and switching the frames of data to the network devices according to the network device identifiers in the frames of data. Some embodiments comprise receiving second frames of data from the network devices, wherein each of the second frames of data comprises the common predetermined IP address as a source IP address and an application-layer header comprising a respective one of the network device identifiers; and switching the second frames of data to the network. Some embodiments comprise storing associations between the network devices and the network device identifiers. Some embodiments comprise generating the associations based on the frames of data.

In general, in one aspect, the invention features a computer program for an apparatus, the computer program comprising: associating all of a plurality of network devices with a different predetermined network device identifier; associating all of the network devices with a single common predetermined internet protocol (IP) address; wherein the apparatus receives frames of data from a network, wherein each of the frames of data comprises the common predetermined IP address as a destination IP address and an application-layer header comprising one of the network device identifiers; and switching the frames of data to the network devices according to the network device identifiers in the frames of data.

In some embodiments, the apparatus receives second frames of data from the network devices, wherein each of the second frames of data comprises the common predetermined IP address as a source IP address and an application-layer header comprising a respective one of the network device identifiers, and the computer program further comprises switching the second frames of data to the network. Some embodiments comprise storing associations between the network devices and the network device identifiers. Some embodiments comprise generating the associations based on the frames of data.

In general, in one aspect, the invention features an apparatus comprising: a plurality of first network devices; and a switch comprising a processor to associate a different one of a plurality of transport-layer port numbers with each of the first network devices in conjunction with a second network device, wherein each of the first network devices transmits first frames of data, each comprising a single common predetermined Internet Protocol (IP) address as a source IP address and the respective transport-layer port number as a source transport-layer port number, a plurality of first interfaces each in communication with one of the first network devices, a second interface to transmit the first frames of data to the second network device, and to receive second frames of data from the second network device, wherein each of the second frames of data comprises the single common predetermined IP address as a destination IP address and one of the transport-layer port numbers as a destination transport-layer port number, and a forwarding engine to transfer each of the second frames of data to the one of the first interfaces in communication with the one of the first network devices associated with the destination transport-layer port number of the second frame of data.

In some embodiments, before the processor associates the transport-layer port numbers in conjunction with the second network device, each of the first network devices is assigned a plurality of the transport-layer port numbers, wherein none of the transport-layer port numbers is assigned to more than one of the first network devices; and wherein, to associate the transport-layer port numbers with each of the first network devices in conjunction with the second network device, the processor selects one of the plurality of the transport-layer port numbers assigned to the first network device in conjunction with the second network device. Some embodiments comprise a memory to store associations between the first network devices and the respective transport-layer port numbers. Some embodiments comprise the second network device.

In general, in one aspect, the invention features an apparatus comprising: a plurality of first network device means; and means for switching comprising processor means for associating a different one of a plurality of transport-layer port numbers with each of the first network device means in conjunction with a second network device, wherein each of the first network device means transmits first frames of data, each comprising a single common predetermined Internet Protocol (IP) address as a source IP address and the respective transport-layer port number as a source transport-layer port number, a plurality of first interface means each in communication with one of the first network device means, second interface means for transmitting the first frames of data to the second network device means, and for receive second frames of data from the second network device means, wherein each of the second frames of data comprises the single common predetermined IP address as a destination IP address and one of the transport-layer port numbers as a destination transport-layer port number, and forwarding engine means for transferring each of the second frames of data to the one of the first interface means in communication with the one of the first network device means associated with the destination transport-layer port number of the second frame of data.

In some embodiments, before the processor means associates the transport-layer port numbers in conjunction with the second network device, each of the first network device means is assigned a plurality of the transport-layer port numbers, wherein none of the transport-layer port numbers is assigned to more than one of the first network device means; and wherein, for associating the transport-layer port numbers with each of the first network device means in conjunction with the second network device, the processor means selects one of the plurality of the transport-layer port numbers assigned to the first network device means in conjunction with the second network device. Some embodiments comprise memory means for storing associations between the first network device means and the respective transport-layer port numbers. Some embodiments comprise the second network device.

In general, in one aspect, the invention features a method comprising: associating a different one of a plurality of transport-layer port numbers with each of a plurality of first network devices in conjunction with a second network device, wherein each of the first network devices transmits first frames of data, each comprising a single common predetermined Internet Protocol (IP) address as a source IP address and the respective transport-layer port number as a source transport-layer port number; transmitting the first frames of data to the second network device; receiving second frames of data from the second network device, wherein each of the second frames of data comprises the single common predetermined IP address as a destination IP address and one of the transport-layer port numbers as a destination transport-layer port number; and transferring each of the second frames of data to the one of the first network devices associated with the destination transport-layer port number of the second frame of data.

Some embodiments comprise assigning a plurality of the transport-layer port numbers to each of the first network devices, wherein none of the transport-layer port numbers is assigned to more than one of the first network devices, before associating the transport-layer port numbers in conjunction with the second network device; wherein associating the transport-layer port numbers with each of the first network devices in conjunction with the second network device comprises selecting one of the plurality of the transport-layer port numbers assigned to the first network device in conjunction with the second network device. Some embodiments comprise storing associations between the first network devices and the respective transport-layer port numbers.

In general, in one aspect, the invention features a computer program for an apparatus, the computer program comprising: associating a different one of a plurality of transport-layer port numbers with each of a plurality of first network devices in conjunction with a second network device, wherein each of the first network devices transmits first frames of data, each comprising a single common predetermined Internet Protocol (IP) address as a source IP address and the respective transport-layer port number as a source transport-layer port number; causing the apparatus to transmit the first frames of data to the second network device; wherein the apparatus receives second frames of data from the second network device, wherein each of the second frames of data comprises the single common predetermined IP address as a destination IP address and one of the transport-layer port numbers as a destination transport-layer port number; and causing the apparatus to transfer each of the second frames of data to the one of the first network devices associated with the destination transport-layer port number of the second frame of data.

Some embodiments comprise assigning a plurality of the transport-layer port numbers to each of the first network devices, wherein none of the transport-layer port numbers is assigned to more than one of the first network devices, before associating the transport-layer port numbers in conjunction with the second network device; wherein associating the transport-layer port numbers with each of the first network devices in conjunction with the second network device comprises selecting one of the plurality of the transport-layer port numbers assigned to the first network device in conjunction with the second network device. Some embodiments comprise storing associations between the first network devices and the respective transport-layer port numbers.

In general, in one aspect, the invention features an apparatus comprising: a plurality of first network devices all associated with a single common predetermined internet protocol (IP) address; and a switch comprising a processor to create an association between each of the first network devices and a different transport-layer port number, to create a sequenced communication session with a second network device for each of the first network devices using the respective one of the transport-layer port numbers and the single common predetermined IP address, and to cause each of the first network devices to assume the respective one of the sequenced communication sessions, a plurality of first interfaces each in communication with one of the first network devices, a second interface to receive frames of data from the second network device, wherein each of the frames of data comprises one of the transport-layer port numbers as a destination transport-layer port number, and a forwarding engine to transfer each of the frames of data to one of the first interfaces according to the associations and the destination transport-layer port numbers in the frames of data, wherein the first interfaces transmit the frames of data to the respective first network devices.

In some embodiments, to cause one of the first network devices to assume the respective one of the sequenced communication sessions, the processor informs the one of the first network devices of the respective transport-layer port number and a sequence number.

In general, in one aspect, the invention features an apparatus comprising: a plurality of first network device means all associated with a single common predetermined internet protocol (IP) address; and means for switching comprising processor means for creating an association between each of the first network device means and a different transport-layer port number, to create a sequenced communication session with a second network device for each of the first network device means using the respective one of the transport-layer port numbers and the single common predetermined IP address, and to cause each of the first network device means to assume the respective one of the sequenced communication sessions, a plurality of first interface means each in communication with one of the first network device means, second interface means for receiving frames of data from the second network device, wherein each of the frames of data comprises one of the transport-layer port numbers as a destination transport-layer port number, and forwarding engine means for transferring each of the frames of data to one of the first interface means according to the associations and the destination transport-layer port numbers in the frames of data, wherein the first interface means transmit the frames of data to the respective first network device means.

In some embodiments, for causing one of the first network device means to assume the respective one of the sequenced communication sessions, the processor means informs the one of the first network device means of the respective transport-layer port number and a sequence number.

In general, in one aspect, the invention features a method comprising: creating an association between each of a plurality of first network devices and a different transport-layer port number, wherein all of the first network devices are associated with a single common predetermined internet protocol (IP) address; creating a sequenced communication session with a second network device for each of the first network devices using the respective one of the transport-layer port numbers and the single common predetermined IP address; causing each of the first network devices to assume the respective one of the sequenced communication sessions; receiving frames of data from the second network device, wherein each of the frames of data comprises one of the transport-layer port numbers as a destination transport-layer port number; and transferring each of the frames of data to one of the first network devices according to the associations and the destination transport-layer port numbers in the frames of data.

In some embodiments, causing one of the first network devices to assume the respective one of the sequenced communication sessions comprises: informing the one of the first network devices of the respective transport-layer port number and a sequence number.

In general, in one aspect, the invention features a computer program for an apparatus, the computer program comprising: creating an association between each of a plurality of first network devices and a different transport-layer port number, wherein all of the first network devices are associated with a single common predetermined internet protocol (IP) address; creating a sequenced communication session with a second network device for each of the first network devices using the respective one of the transport-layer port numbers and the single common predetermined IP address; causing each of the first network devices to assume the respective one of the sequenced communication sessions; wherein the apparatus receives frames of data from the second network device, wherein each of the frames of data comprises one of the transport-layer port numbers as a destination transport-layer port number; and causing the apparatus to transfer each of the frames of data to one of the first network devices according to the associations and the destination transport-layer port numbers in the frames of data.

In some embodiments, causing one of the first network devices to assume the respective one of the sequenced communication sessions comprises: informing the one of the first network devices of the respective transport-layer port number and a sequence number.

In general, in one aspect, the invention features an apparatus comprising: a plurality of first network devices each to initiate a sequenced communication session with a second network device, wherein each of first network devices selects a transport-layer port number, and transmits a first frame of data comprising a predetermined internet protocol (IP) address associated with all of the first network devices as a source IP address, and the selected transport-layer port number as a source transport-layer port number; and a switch comprising a plurality of first interfaces each to receive the first frames of data from one of the first network devices, a processor to create associations between the first network devices and the source transport-layer port numbers in the respective first frames of data, a second interface to transmit the first frames of data to the second network device, and to receive second frames of data from the second network device in response to the first frames of data, wherein each of the second frames of data comprises the predetermined IP address as a destination IP address and one of the transport-layer port numbers as a destination transport-layer port number, and a forwarding engine to transfer the second frames of data to the first interfaces according to the associations and the destination transport-layer port numbers in the second frames of data, wherein the first interfaces transmit the second frames of data to the respective first network devices.

In some embodiments, when one of the first network devices initiates a first one of the sequenced communication sessions using a first transport-layer port number that is currently used in a second one of the sequenced communication sessions, the processor terminates the first one of the sequenced communication sessions, and initiates a third sequenced communication session with the second network device using a second transport-layer port number and causes the one of the first network devices to assume the third sequenced communication session. In some embodiments, to cause the one of the first network devices to assume the third sequenced communication session, the processor informs the one of the first network devices of the second transport-layer port number and a sequence number.

In general, in one aspect, the invention features an apparatus comprising: a plurality of first network device means each for initiating a sequenced communication session with a second network device, wherein each of first network device means selects a transport-layer port number, and transmits a first frame of data comprising a predetermined internet protocol (IP) address associated with all of the first network devices as a source IP address, and the selected transport-layer port number as a source transport-layer port number; and means for switching comprising a plurality of first interface means each for receiving the first frames of data from one of the first network device means, processor means for creating associations between the first network device means and the source transport-layer port numbers in the respective first frames of data, second interface means for transmitting the first frames of data to the second network device, and for receiving second frames of data from the second network device in response to the first frames of data, wherein each of the second frames of data comprises the predetermined IP address as a destination IP address and one of the transport-layer port numbers as a destination transport-layer port number, and forwarding engine means for transferring the second frames of data to the first interface means according to the associations and the destination transport-layer port numbers in the second frames of data, wherein the first interface means transmit the second frames of data to the respective first network device means.

In some embodiments, when one of the first network device means initiates a first one of the sequenced communication sessions using a first transport-layer port number that is currently used in a second one of the sequenced communication sessions, the processor means terminates the first one of the sequenced communication sessions, and initiates a third sequenced communication session with the second network device using a second transport-layer port number and causes the one of the first network device means to assume the third sequenced communication session. In some embodiments, to cause the one of the first network device means to assume the third sequenced communication session, the processor means informs the one of the first network device means of the second transport-layer port number and a sequence number.

In general, in one aspect, the invention features a method comprising: initiating a sequenced communication session from each of a plurality of first network devices to a second network device, wherein initiating each communication session comprises selecting a transport-layer port number, and generating a first frame of data comprising a predetermined interne protocol (IP) address associated with all of the first network devices as a source IP address, and the selected transport-layer port number as a source transport-layer port number; creating associations between the first network devices and the source transport-layer port numbers in the respective first frames of data, transmitting the first frames of data to the second network device; receiving second frames of data from the second network device in response to the first frames of data, wherein each of the second frames of data comprises the predetermined IP address as a destination IP address and one of the transport-layer port numbers as a destination transport-layer port number; and transferring the second frames of data to the first network devices according to the associations and the destination transport-layer port numbers in the second frames of data.

Some embodiments comprise, when a plurality of the sequenced communication sessions use the same transport-layer port number: terminating one of the sequenced communication sessions; initiating a further sequenced communication session with the second network device using a different transport-layer port number; and causing the first network device having the terminated sequenced communication session to assume the further sequenced communication session. In some embodiments, causing the one of the first network devices to assume the further sequenced communication session comprises: informing the one of the first network devices of the different transport-layer port number and a sequence number.

In general, in one aspect, the invention features a computer program for an apparatus, the computer program comprising: initiating a sequenced communication session from each of a plurality of first network devices to a second network device, wherein initiating each communication session comprises selecting a transport-layer port number, and generating a first frame of data comprising a predetermined internet protocol (IP) address associated with all of the first network devices as a source IP address, and the selected transport-layer port number as a source transport-layer port number; creating associations between the first network devices and the source transport-layer port numbers in the respective first frames of data, causing the apparatus to transmit the first frames of data to the second network device; wherein the apparatus receives second frames of data from the second network device in response to the first frames of data, wherein each of the second frames of data comprises the predetermined IP address as a destination IP address and one of the transport-layer port numbers as a destination transport-layer port number; and causing the apparatus to transfer the second frames of data to the first network devices according to the associations and the destination transport-layer port numbers in the second frames of data.

Some embodiments comprise, when a plurality of the sequenced communication sessions use the same transport-layer port number: terminating one of the sequenced communication sessions; initiating a further sequenced communication session with the second network device using a different transport-layer port number; and causing the first network device having the terminated sequenced communication session to assume the further sequenced communication session. In some embodiments, causing the one of the first network devices to assume the further sequenced communication session comprises: informing the one of the first network devices of the different transport-layer port number and a sequence number.

In general, in one aspect, the invention features an apparatus comprising: a plurality of first network devices, wherein all of the first network devices are associated with a single common predetermined internet protocol (IP) address and each of the first network devices is associated with a different transport-layer protocol number; and a switch comprising a plurality of first interfaces each in communication with one of the first network devices, a second interface to receive frames of data from a second network device, wherein each of the frames of data comprises the single common predetermined IP address as a destination IP address and one of the transport-layer protocol numbers as a destination transport-layer port number, and a forwarding engine to transfer each of the frames of data to the one of the first interfaces in communication with the one of the first network devices associated with the transport-layer protocol number of the frame of data, wherein the first interfaces transmit the frames of data to the respective first network devices.

In some embodiments, each of the first network devices transmits further frames of data comprising the single common predetermined IP address as a source address and the respective one of the transport-layer protocol numbers as a source transport-layer port number; wherein the first interfaces receive the further frames of data; wherein the forwarding engine transfers the further frames of data to the second interface; and wherein the second interface transmits the further frames of data to the second network device. In some embodiments, each of the first network devices comprises a processor to execute an application that binds to the respective transport-layer protocol number. Some embodiments comprise the second network device. In some embodiments, the second network device comprises: a processor to execute an application that binds to the transport-layer protocol numbers associated with the first network devices; and a third interface to receive the frames of data, and to transmit the further frames of data.

In general, in one aspect, the invention features an apparatus comprising: a plurality of first network device means, wherein all of the first network device means are associated with a single common predetermined internet protocol (IP) address and each of the first network device means is associated with a different transport-layer protocol number; and means for switching comprising a plurality of first interface means each in communication with one of the first network device means, second interface means for receiving frames of data from a second network device, wherein each of the frames of data comprises the single common predetermined IP address as a destination IP address and one of the transport-layer protocol numbers as a destination transport-layer port number, and forwarding engine means for transferring each of the frames of data to the one of the first interface means in communication with the one of the first network device means associated with the transport-layer protocol number of the frame of data, wherein the first interface means transmit the frames of data to the respective first network device means.

In some embodiments, each of the first network device means transmits further frames of data comprising the single common predetermined IP address as a source address and the respective one of the transport-layer protocol numbers as a source transport-layer port number; wherein the first interface means receive the further frames of data; wherein the forwarding engine means transfers the further frames of data to the second interface means; and wherein the second interface means transmits the further frames of data to the second network device. In some embodiments, each of the first network device means comprises processor means for executing an application that binds to the respective transport-layer protocol number. Some embodiments comprise the second network device. In some embodiments, the second network device comprises: processor means for executing an application that binds to the transport-layer protocol numbers associated with the first network device means; and third interface means for receiving the frames of data, and for transmitting the further frames of data.

In general, in one aspect, the invention features a method comprising: associating a plurality of first network devices with a single common predetermined internet protocol (IP) address; associating each of the first network devices with a different transport-layer protocol number; receiving frames of data from a second network device, wherein each of the frames of data comprises the single common predetermined IP address as a destination IP address and one of the transport-layer protocol numbers as a destination transport-layer port number; and transferring each of the frames of data to the one of the first network devices associated with the transport-layer protocol number of the frame of data.

In some embodiments, each of the first network devices transmits further frames of data comprising the single common predetermined IP address as a source address and the respective one of the transport-layer protocol numbers as a source transport-layer port number, and the method further comprises: transmitting the further frames of data to the second network device. Some embodiments comprise binding applications executing on each of the first network devices to the respective transport-layer protocol number. In some embodiments, the second network device executes an application that binds to the transport-layer protocol numbers associated with the first network devices, receives the frames of data, and transmits the further frames of data.

In general, in one aspect, the invention features a computer program for an apparatus, the computer program comprising: associating a plurality of first network devices with a single common predetermined internet protocol (IP) address; associating each of the first network devices with a different transport-layer protocol number; wherein the apparatus receives frames of data from a second network device, wherein each of the frames of data comprises the single common predetermined IP address as a destination IP address and one of the transport-layer protocol numbers as a destination transport-layer port number; and causing the apparatus to transfer each of the frames of data to the one of the first network devices associated with the transport-layer protocol number of the frame of data.

In some embodiments, each of the first network devices transmits further frames of data comprising the single common predetermined IP address as a source address and the respective one of the transport-layer protocol numbers as a source transport-layer port number, and the computer program further comprises: causing the apparatus to transmit the further frames of data to the second network device. Some embodiments comprise binding applications executing on each of the first network devices to the respective transport-layer protocol number. In some embodiments, the second network device executes an application that binds to the transport-layer protocol numbers associated with the first network devices, receives the frames of data, and transmits the further frames of data.

The details of one or more implementations are set forth in the accompanying drawings and the description below. Other features will be apparent from the description and drawings, and from the claims.

Figure 1:
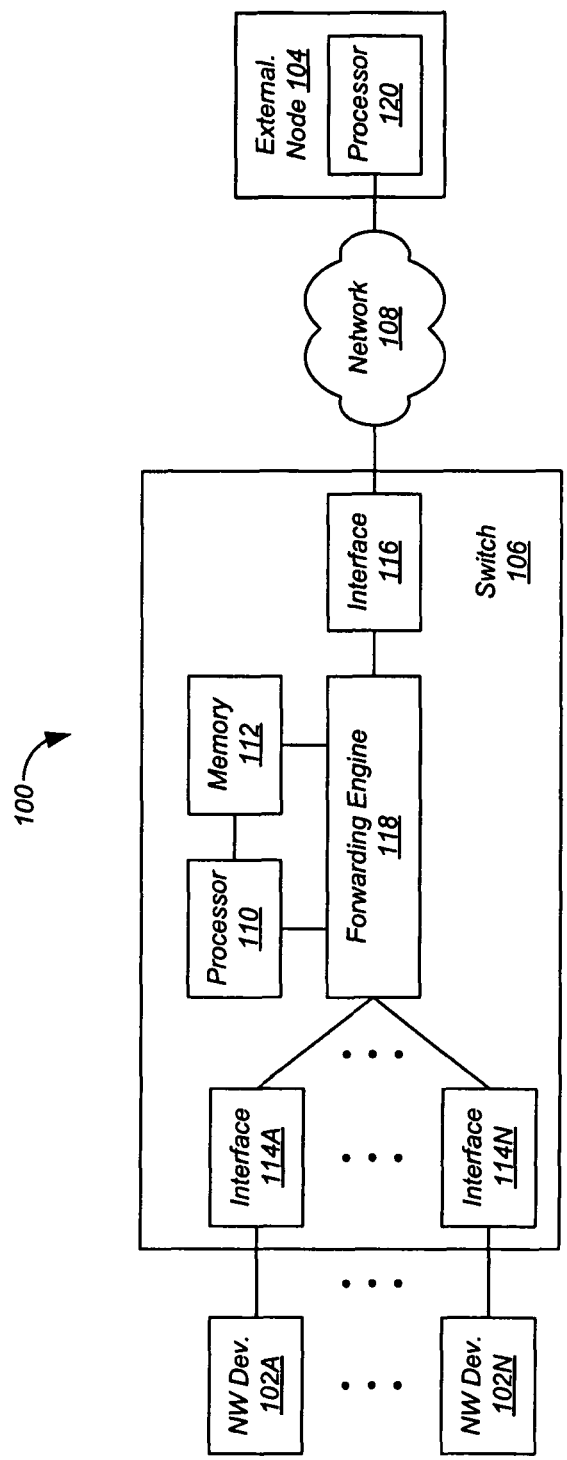
FIG. 1 shows an apparatus comprising a plurality of network devices in communication with an external node via a switch and a network according to a preferred embodiment of the present invention.

The leading digit(s) of each reference numeral used in this specification indicates the number of the drawing in which the reference numeral first appears.

DETAILED DESCRIPTION

Embodiments of the present invention permit multiple network devices to share a single internet protocol (IP) address to communicate via a switch with an external node without employing address translation techniques such as those employed by NAT and NATP. In each embodiment, frames of data transmitted by the external node to one of the network devices are switched according to some value in the frame other than the destination address, rather than according to the destination address.

According to some embodiments, each network device is assigned one or more transport-layer port numbers, where no two network devices share any of the port numbers, and frames of data are switched to the network devices based on the port numbers. According to some embodiments, the external node executes an application that binds to a plurality of transport-layer port numbers, where each port number is associated with one of the network devices but no two network devices share any of the port numbers, and frames of data are switched to the network devices based on the port numbers. According to some embodiments, each frame includes an application-layer header that includes a network device identifier, and frames of data are switched to the network devices based on the network device identifiers. According to some embodiments, the switch negotiates with the external node to select a transport-layer port that is subsequently used to switch frames of data to one of the network devices. According to some embodiments, the switch and external node begin a sequenced communication session such as a File Transfer Protocol (FTP) session, and then one of the network devices takes over for the switch after a data-plane port for the session is selected.

FIG. 1 shows an apparatus 100 comprising a plurality of network devices 102A-N in communication with an external node 104 via a switch 106 and a network 108 according to a preferred embodiment of the present invention. Network devices 102 can be implemented as line cards in a chassis, as separate computers, and the like. External node 104 can be implemented similarly. Network 108 can be any data communications network, for example such as the Internet and the like. Switch 106 preferably comprises a processor 110, a memory 112, a plurality of internal interfaces 114A-N each in communication with one of network devices 102A-N, an external interface 116 in communication with network 108, and a forwarding engine 118 to transfer frames of data among interfaces 114, 116 and processor 110. External node 104 preferably comprises a processor 120.

Figure 2:
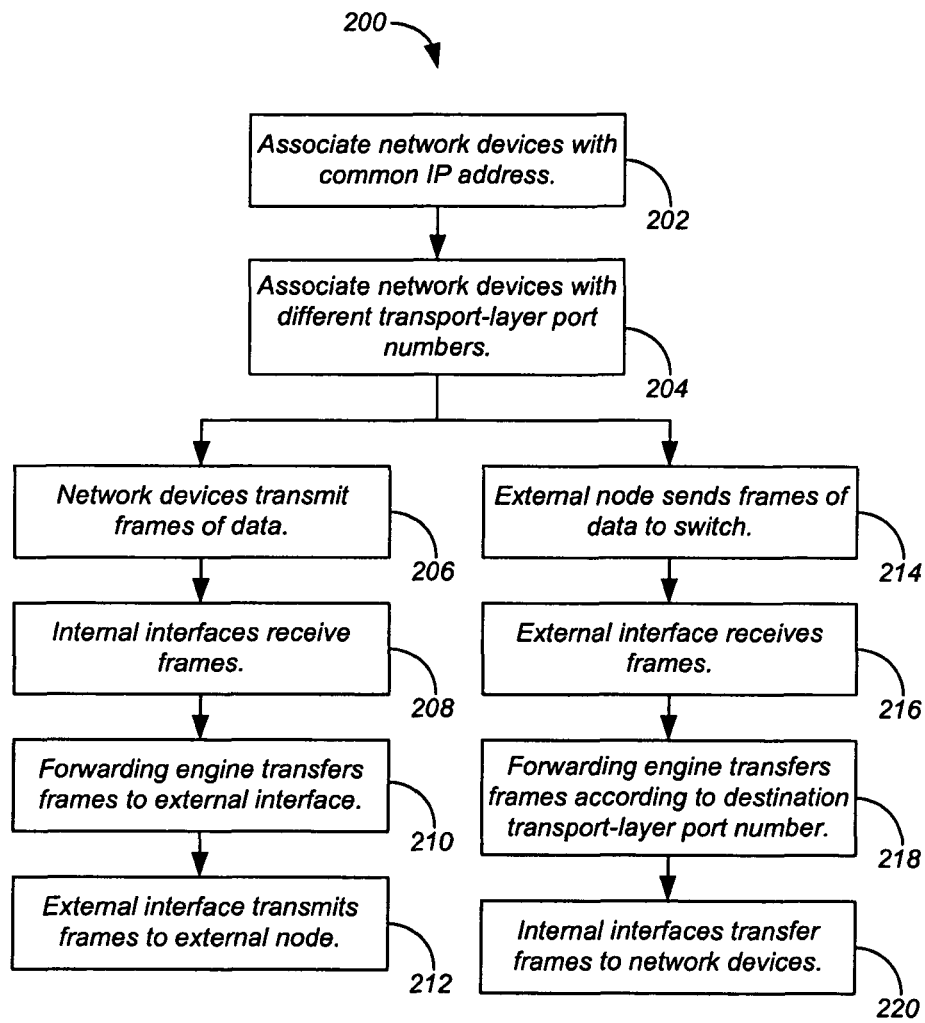
FIG. 2 shows a process according to a preferred embodiment of the present invention wherein each network device is assigned one or more transport-layer port numbers, where no two network devices share any of the port numbers, and frames of data are switched to network devices based on the port numbers.

According to some embodiments, each network device 102 is assigned one or more transport-layer port numbers, where no two network devices 102 share any of the transport-layer port numbers, and frames of data are switched to network devices 102 based on the transport-layer port numbers. FIG. 2 shows a process 200 according to a preferred embodiment of the present invention. All of network devices 102 are associated with a single common predetermined IP address (step 202) according to conventional techniques. Each of network devices 102 is also associated with one or more predetermined transport-layer port numbers that are not associated with any others of network devices 102 (step 204) according to conventional techniques, for example by modifying the Transmission Control Protocol (TCP) part of the TCP/Internet Protocol (TCP/IP) stacks of network devices 102. When multiple transport-layer port numbers are associated with a network device 102, the transport-layer port numbers are preferably chosen to be selectable by masking in order to facilitate the use of Ternary Content Addressable Memory (TCAM) lookup techniques.

Network devices 102 transmit frames of data (step 206) where each frame comprises the common predetermined IP address associated with all of network devices 102 as the source IP address of the frame and the predetermined transport-layer port number associated with the respective network device 102 as the source transport-layer port number of the frame.

Internal interfaces 114 receive the frames of data from network devices 102 (step 208). Forwarding engine 118 transfers the frames of data from internal interfaces 114 to external interface 116 (step 210). External interface 116 transmits the frames of data to external node 104 via network 108 (step 212).

External node 104 optionally replies to the frames of data by sending frames of data to switch 106 via network 108 (step 214). Each of the reply frames comprises the common predetermined IP address of network nodes 102 as the destination IP address of the reply frame and the transport-layer port number from the frame sent by a network device 102 as the destination transport-layer port number in the reply to that frame. External interface 116 receives the reply frames (step 216).

Forwarding engine 118 transfers each of the reply frames in accordance with the destination transport-layer port number of the frame (step 218). That is, forwarding engine 118 transfers each of the reply frames to the internal interface 114 that is in communication with the network device 102 associated with the destination transport-layer port number of the reply frame of data. Internal interfaces 114 transfer the reply frames to the respective network devices 102 (step 220).

Preferably memory 112 stores the associations between network devices 102 and the predetermined transport-layer port numbers. In some embodiments switch 106 learns the associations. That is, processor 110 generates the associations based on the frames of data generated by network devices 102. In other embodiments the associations are provisioned prior to operation. In these embodiments, external node 104 can initiate communication sessions immediately. External node 104 can be made aware of the associations between network devices 102 and the predetermined transport-layer port numbers, for example by modifying the TCP portion of the TCP/IP stack of external node 104, or using an application executed by processor 120 of external node 104 over a conventional TCP/IP stack.

According to some embodiments, external node 104 executes an application that binds to a plurality of transport-layer port numbers, where each transport-layer port number is associated with one of network devices 102 but no two network devices 102 share any of the transport-layer port numbers, and frames of data are switched to network devices 102 based on the transport-layer port numbers.

Figure 3:
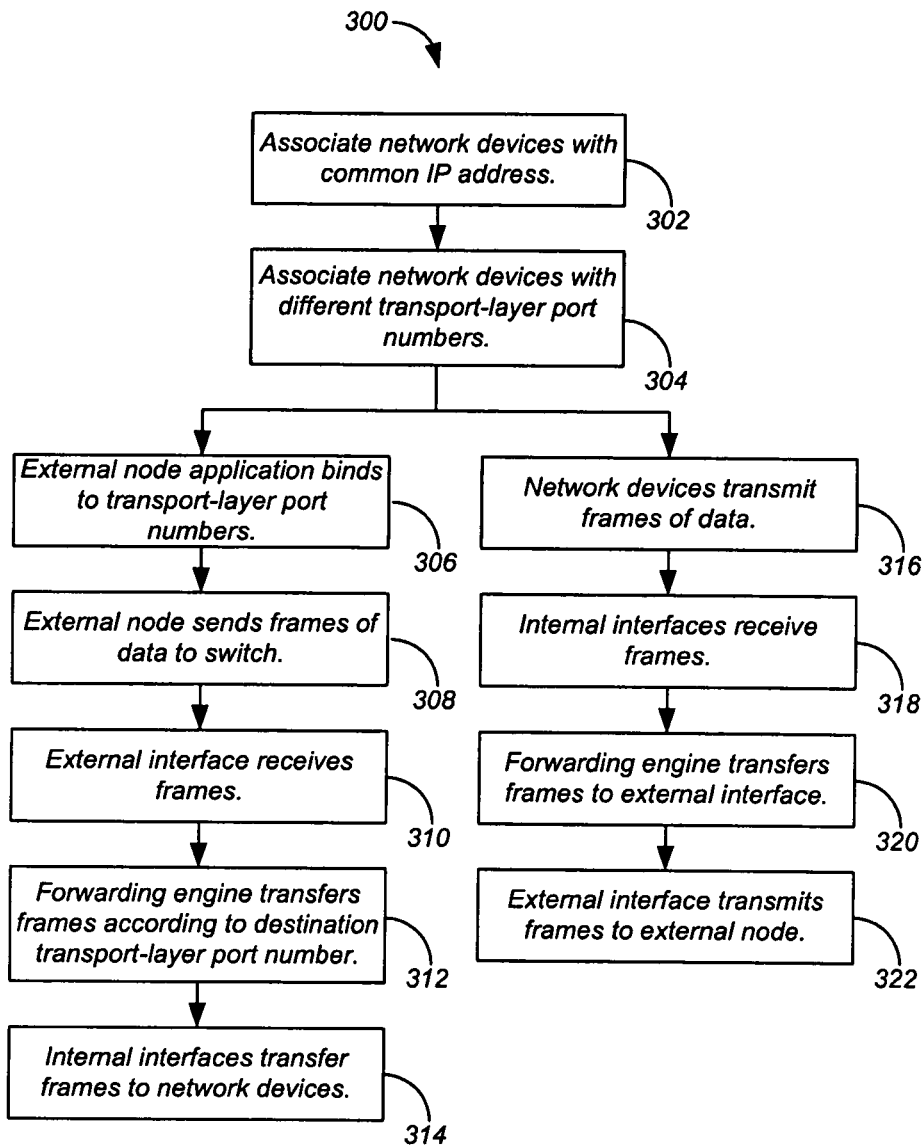
FIG. 3 shows a process according to a preferred embodiment of the present invention wherein the external node executes an application that binds to a plurality of transport-layer port numbers, where each port number is associated with one of the network devices but no two network devices share any of the port numbers, and frames of data are switched to network devices based on the port numbers.

FIG. 3 shows a process 300 according to a preferred embodiment of the present invention. All of network devices 102 are associated with a single common predetermined IP address (step 302) according to conventional techniques. Each of network devices 102 is also associated with one or more predetermined transport-layer port numbers that are not associated with any others of network devices 102 (step 304) according to conventional techniques. When multiple transport-layer port numbers are associated with a network device 102, the transport-layer port numbers are preferably chosen to be selectable by masking in order to facilitate the use of Ternary Content Addressable Memory (TCAM) lookup techniques.

Processor 120 of external node 104 executes an application that binds to at least one of the predetermined transport-layer port numbers associated with each of network devices 102 (step 306). That is, the application binds with at least N transport-layer port numbers each associated with a different one of the N network devices 102. The application then causes external node 104 to transmit frames of data to switch 106 (step 308). Each of the frames of data comprises the common predetermined IP address associated with all of network devices 102 as a destination IP address and one of the bound predetermined transport-layer port numbers as a destination transport-layer port number.

External interface 116 receives the frames of data (step 310). Forwarding engine 118 transfers each of the frames in accordance with the destination transport-layer port number of the frame (step 312). That is, forwarding engine 118 transfers each of the frames to the internal interface 114 that is in communication with the network device 102 associated with the destination transport-layer port number of the frame of data. Internal interfaces 114 transfer the frames to the respective network devices 102 (step 314).

Network devices 102 preferably transmit frames of data to external node 104 (step 316) where each frame comprises the common predetermined IP address associated with all of network devices 102 as the source IP address of the frame and the predetermined transport-layer port number associated with the respective network device 102 as the source transport-layer port number of the frame.

Internal interfaces 114 receive the frames of data from network devices 102 (step 318). Forwarding engine 118 transfers the frames of data from internal interfaces 114 to external interface 116 (step 320). External interface 116 transmits the frames of data to external node 104 via network 108 (step 322).

Preferably memory 112 stores the associations between network devices 102 and the predetermined transport-layer port numbers. Preferably the associations are provisioned prior to operation.

Figure 4:
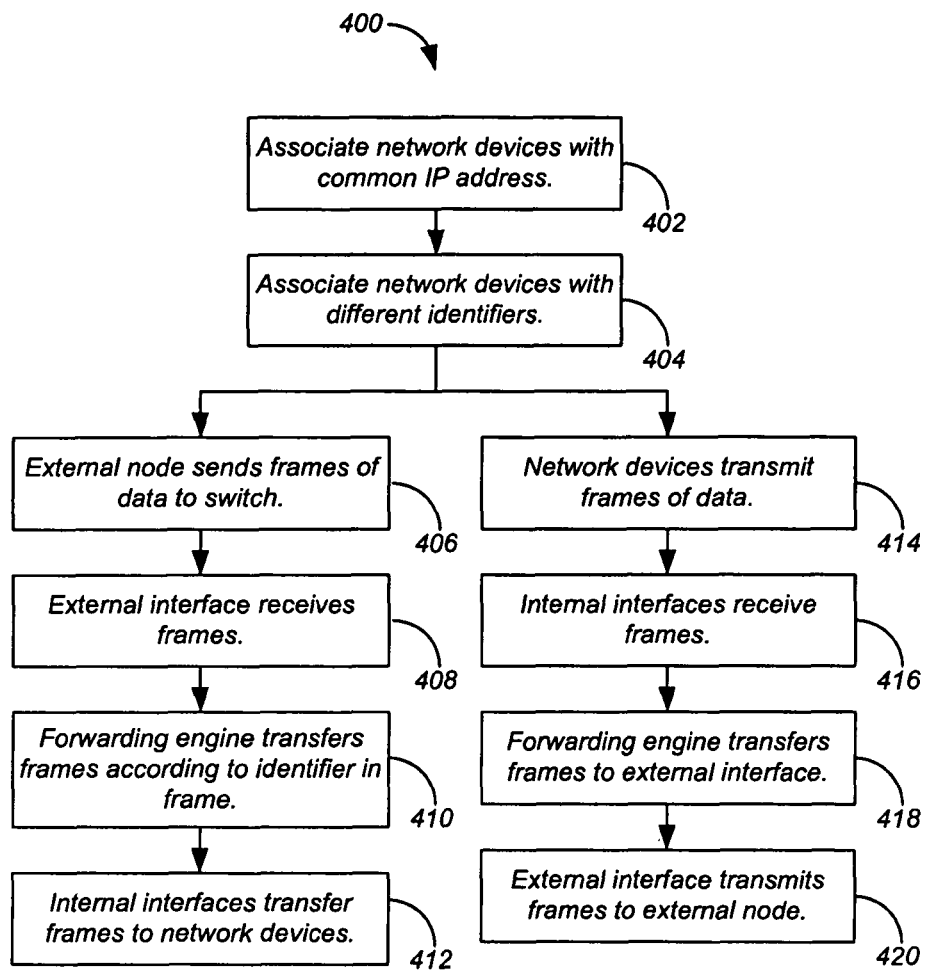
FIG. 4 shows a process according to a preferred embodiment of the present invention wherein each frame includes an application-layer header that includes a network device identifier, and frames of data are switched to the network devices based on the network device identifiers.

According to some embodiments, each frame includes an application-layer header that includes a network device identifier, and frames of data are switched to network devices 102 based on the network device identifiers. FIG. 4 shows a process 400 according to a preferred embodiment of the present invention. All of network devices 102 are associated with a single common predetermined IP address (step 402) according to conventional techniques. Each of network devices 102 is also associated with a different predetermined network device identifier (step 404).

External node 104 transmits frames of data to switch 106 (step 406). Each of the frames of data comprises the common predetermined IP address associated with all of network devices 102 as a destination IP address and an application-layer header comprising one of the network device identifiers associated with network devices 102.

External interface 116 receives the frames of data (step 408). Forwarding engine 118 transfers each of the frames in accordance with the network device identifier in the application-layer header of the frame (step 410). That is, forwarding engine 118 transfers each of the frames to the internal interface 114 that is in communication with the network device 102 associated with the network device identifier in the application-layer header of the frame. Internal interfaces 114 transfer the frames to the respective network devices 102 (step 412).

Network devices 102 preferably transmit frames of data to external node 104 (step 414) where each frame comprises the common predetermined IP address associated with all of network devices 102 as the source IP address of the frame and the network device identifier associated with the respective network device 102 in the application-layer header of the frame.

Internal ports 114 receive the frames of data from network devices 102 (step 416). Forwarding engine 118 transfers the frames of data from internal interfaces 114 to external interface 116 (step 418). External interface 116 transmits the frames of data to external node 104 via network 108 (step 420).

Preferably memory 112 stores the associations between network devices 102 and the predetermined network device identifiers. In some embodiments switch 106 learns the associations. That is, processor 110 generates the associations based on the frames of data generated by network devices 102. In other embodiments the associations are provisioned prior to operation. In these embodiments, external node 104 can initiate communication sessions immediately.

Figure 5:
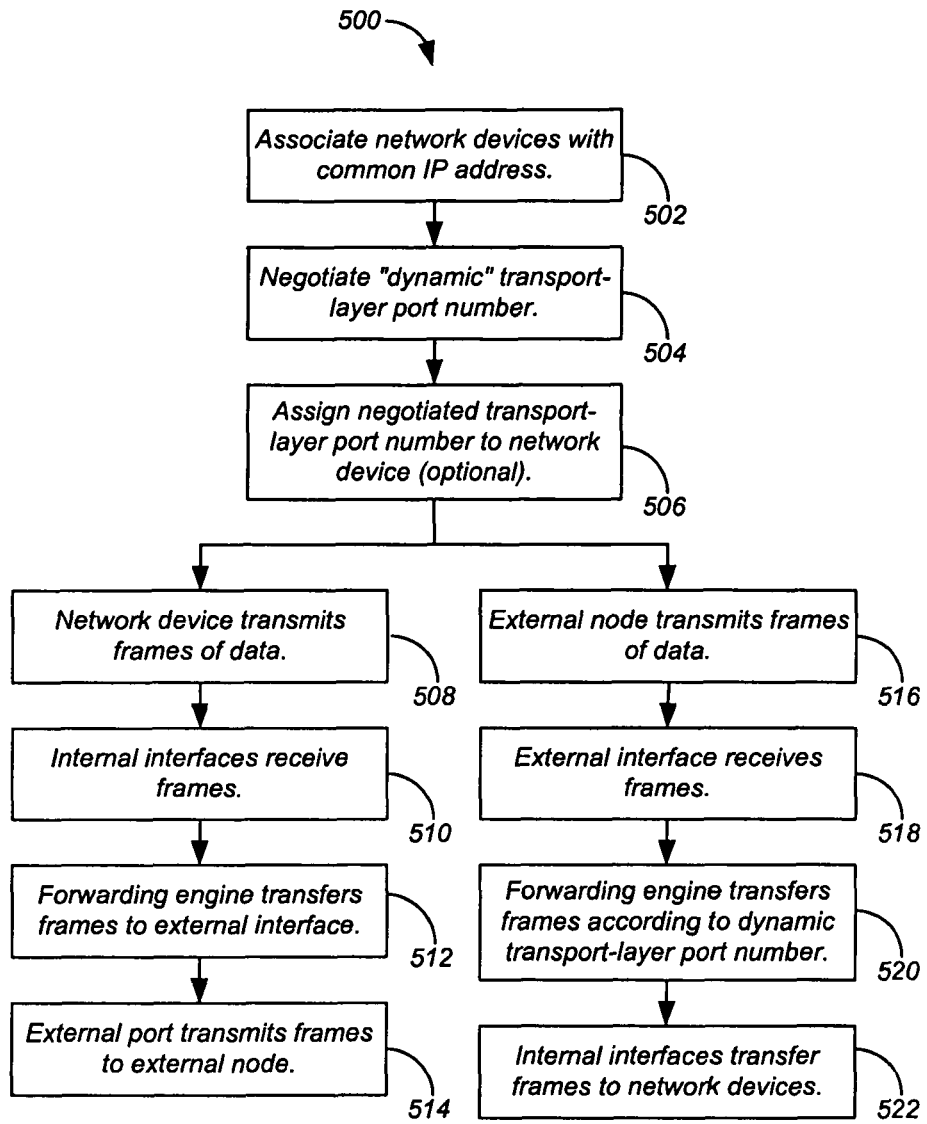
FIG. 5 shows a process according to a preferred embodiment of the present invention wherein the switch negotiates with the external node to select a transport-layer port number that is subsequently used to switch frames of data to one of the network devices.

According to some embodiments, switch 106 negotiates with external node 104 to select a transport-layer port number that is subsequently used to switch frames of data to one of network devices 102. In various embodiments this technique is used for both outbound connections (that is, to initiate connections from network devices 102) and inbound connections (that is, to accept, connections initiated by external node 104). FIG. 5 shows a process 500 using dynamic transport-layer port numbers according to a preferred embodiment of the present invention. All of network devices 102 are associated with a single common predetermined IP address (step 502) according to conventional techniques.

Processor 110 of switch 106 uses the common predetermined IP address to communicate with external node 104 on the control plane in order to negotiate a "dynamic" transport-layer port number to be used for subsequent data-plane communications between external node 104 and one of network devices 102 (step 504). That is, processor 110 associates a dynamic transport-layer port number with network device 102 in conjunction with external node 104. For example, processor 110 generates at least one frame of data comprising the common predetermined IP address as the source IP address and the IP address of external node 104 as the destination IP address, and receives at least one frame of data comprising the common predetermined IP address as the destination IP address and the IP address of external node 104 as the source IP address. At least one of the frames of data identifies the dynamic transport-layer port number. The negotiation process can take any form, for example such as the port negotiation process employed by the File Transfer Protocol (FTP).

Processor 110 optionally assigns the negotiated dynamic transport-layer port number to the network device 102 (step 506), which subsequently uses the negotiated dynamic transport-layer port number for data-plane communications with external node 104. In other embodiments, a plurality of the dynamic transport-layer port numbers is assigned to each of network devices 102 in advance. That is, each of network devices 102 is associated with a plurality of the dynamic transport-layer port numbers, wherein none of the dynamic transport-layer port numbers is associated with more than one of network devices 102, and the negotiation for a network device 102 is limited to the dynamic transport-layer port numbers pre-assigned to that network device 102. In these embodiments, processor 110 need not assign the negotiated dynamic transport-layer port number to the network device 102.

Network device 102 then transmits frames of data (step 508) each comprising the common predetermined IP address as the source IP address, the negotiated dynamic transport-layer port number as the source transport-layer port number, and the IP address of external node 104 as the destination IP address. The respective internal interface 114 receives the frames (step 510), which are then transferred by forwarding engine 118 to external interface 116 (step 512), which then transmits the frames of data to external node 104 (step 514).

External node 104 transmits frames of data to network device 102 (step 516). Each of the frames comprise the common predetermined IP address as the destination address, the negotiated dynamic transport-layer port number as the destination transport-layer port number, and the IP address of external node 104 as a source IP address. External interface 116 of switch 106 receives the frames of data (step 518). Forwarding engine 118 transfers the frames of data to the internal interface 114 in communication with the network device 102 based on the negotiated dynamic transport-layer port number (step 520), which then transmits the frames of data to the network device 102 (step 522). Preferably memory 112 stores an association between the network device 102 and the negotiated dynamic transport-layer port number.

Figure 6:
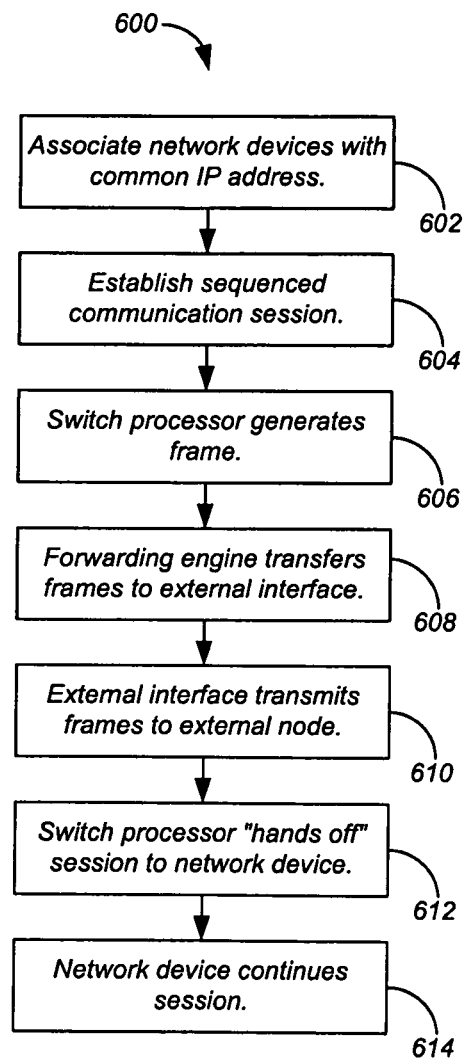
FIG. 6 shows a process according to a preferred embodiment of the present invention wherein the switch and the external node begin a sequenced communication session, and then one of the network devices takes over for the switch after a data-plane port for the session is selected.

According to some embodiments, switch 106 creates a sequenced communication session with external node 104, and then causes one of network devices 102 to assume the sequenced communication session (that is, to take over for switch 106) after a data-plane transport-layer port number for the session is selected. One advantage of this approach is that it is not necessary to modify the TCP/IP stacks in network devices 102 or in external node 104. In some embodiments, processor 110 of switch 106 acts as a proxy for a network device 102 until high-bandwidth communications are needed, then hands off its part of the sequenced communication session to the network device 102. FIG. 6 shows a process 600 according to a preferred embodiment of the present invention. All of network devices 102 are associated with a single common predetermined IP address (step 602) according to conventional techniques.

Processor 110 of switch 106 uses the common predetermined IP address to communicate with external node 104 on the control plane in order to establish a sequenced communication session (step 604). A "sequenced communication session" as used herein refers to a communication session in which each frame comprises a sequence number, for example such as a File Transfer Protocol (FTP) session.

For example, processor 110 selects a transport-layer port number and generates at least one frame of data (step 606) comprising the common predetermined IP address as the source IP address, the transport-layer port number as a source transport-layer port number, and the IP address of external node 104 as the destination IP address, and receives at least one frame of data comprising the common predetermined IP address as the destination IP address, the transport-layer port as a source transport-layer port number, and the IP address of external node 104 as the source IP address. At least one of the frames of data comprises a sequence number. The frames are then transferred by forwarding engine 118 to external interface 116 (step 608), which then transmits the frames of data to external node 104 (step 610).

Once the sequenced communication session is established, processor 110 of switch 106 "hands off" its part of the session to network device 102 (step 612). Preferably processor 110 informs network device 102 of the transport-layer port number and the most recent sequence number used in the session.

Network device 102 then continues the sequenced communication session with external node 104 using sequence numbers based on the most recent sequence number (step 614). For example, network device 102 transmits frames of data each comprising the common predetermined IP address as the source IP address, the transport-layer port as a source port, the second IP address as a destination IP address, and a sequence number based on the most recent sequence number. The respective internal interface 114 receives the frames, which are then transferred by forwarding engine 118 to external interface 116, which then transmits the frames of data to external node 104.

As part of the session, external node 104 transmits frames of data to network device 102. Each of the frames comprises the common predetermined IP address as the destination address, the transport-layer port as the destination transport-layer port number, the IP address of external node 104 as a source IP address, and a sequence number based on the sequence numbers in the frames received from network device 102. External interface 116 of switch 106 receives the frames of data. Forwarding engine 118 transfers the frames of data to the internal interface 114 in communication with network device 102, which then transmits the frames of data to network device 102. Preferably memory 112 stores an association between network device 102 and the selected transport-layer port number.

According to some embodiments, each network device 102 selects a transport-layer port number and creates a sequenced communication session with external node 104 using the selected transport-layer port number. A "sequenced communication session" as used herein refers to a communication session in which each frame comprises a sequence number, for example such as a File Transfer Protocol (FTP) session. Switch 106 then switches frames of data to network devices 102 using the selected transport-layer port numbers. Preferably processor 110 of switch 106 prevents any two network devices 102 from using the same transport-layer port number.

Figure 7:
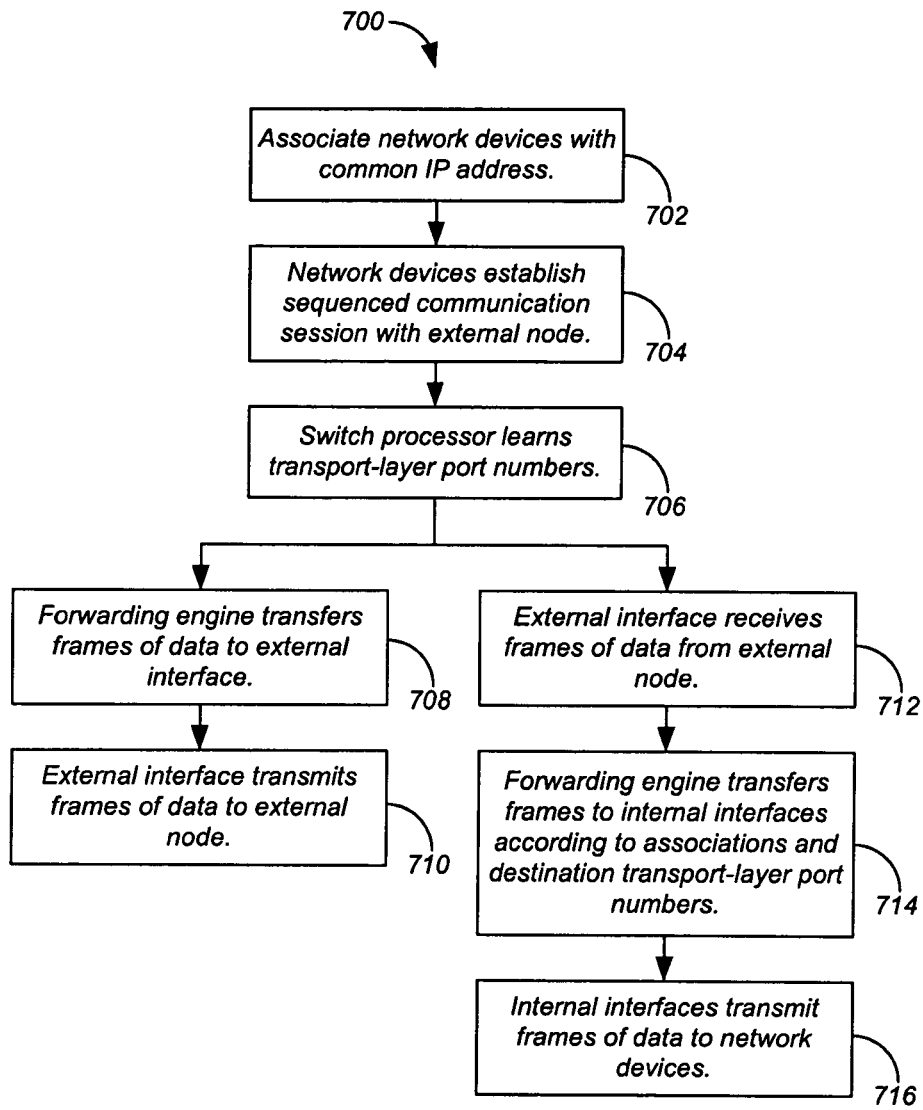
FIG. 7 shows a process according to a preferred embodiment of the present invention wherein each network device selects a transport-layer port number and creates a sequenced communication session with the external node using the selected transport-layer port number.

FIG. 7 shows a process 700 according to a preferred embodiment of the present invention. All of network devices 102 are associated with a single common predetermined IP address (step 702) according to conventional techniques. Each network device 102 establishes a sequenced communication session with external node 104 (step 704). In particular, each network device 102 selects a transport-layer port number, and transmits a frame of data comprising the common IP address as a source IP address and the selected transport-layer port number as a source transport-layer port number. Each internal interfaces 114 receive the frames of data from one of network devices 102.

Processor 110 of switch 102 learns the transport-layer port numbers (step 706). That is, processor 110 creates associations between network devices 102 and the source transport-layer port numbers in the frames of data received from network devices 102. Preferably processor 110 of switch 106 prevents any two network devices 102 from using the same transport-layer port number. For example, if a first network device 102 initiates a first sequenced communication sessions using a first transport-layer port number that is currently used in a second sequenced communication session, processor 110 terminates the first sequenced communication session and initiates a third sequenced communication session using another transport-layer port number, and causes the first network device 102 to assume the third sequenced communication session, for example by informing the first network device 102 of the new transport-layer port number and a sequence number for the session. Forwarding engine 118 transfers the frames of data to external interface 116 (step 708), which transmits the frames of data to external node 104 (step 710).

External interface 116 receives frames of data from external node 104 (step 712). Each of the frames of data comprises the predetermined IP address as a destination IP address and one of the transport-layer port numbers as a destination transport-layer port number. Forwarding engine 118 transfers each frame of data to one of internal interfaces 114 according to the associations created by processor 110 and the destination transport-layer port numbers in the frames of data (step 714). Internal interfaces transmit the frames of data to the respective network devices 102 (step 716).

Figure 8:
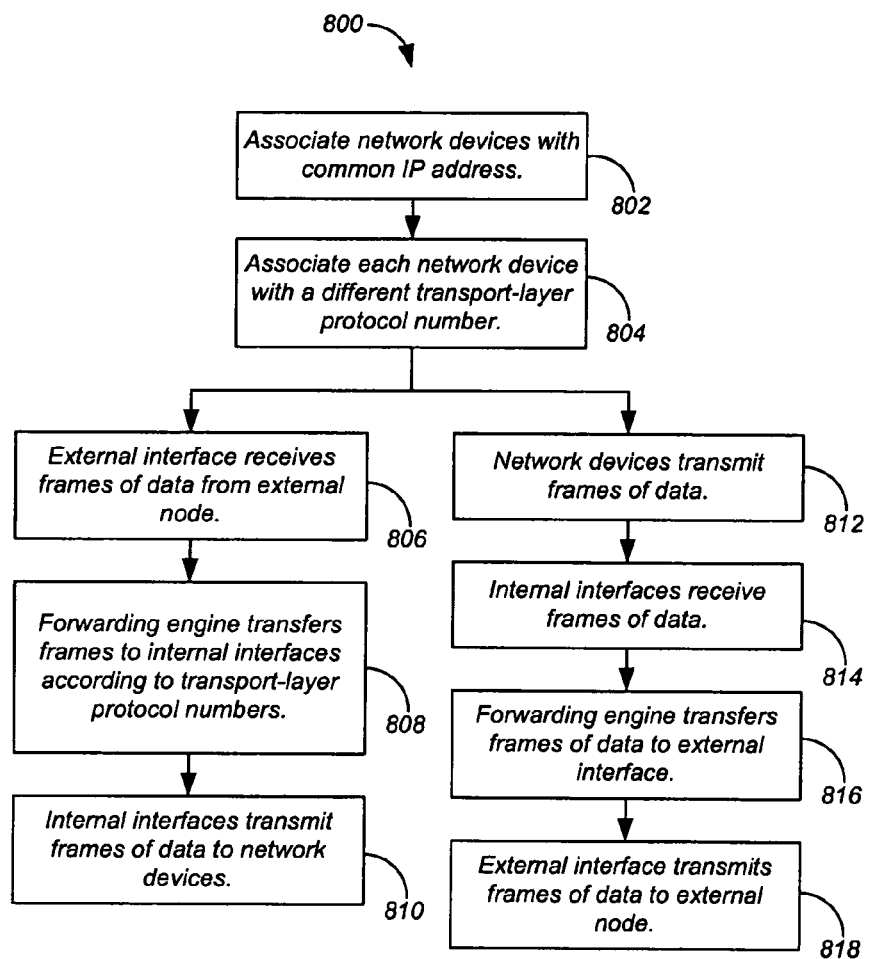
FIG. 8 shows a process according to a preferred embodiment of the present invention wherein an application executing on the external node binds to the IP part of the TCP/IP stack on the external node as N different transport-layer protocols, each associated with one of the network devices, and the switch switches frames to the network devices using the transport-layer protocols.

According to some embodiments, an application executing on external node 104 binds to the IP part of the TCP/IP stack on external node 104 as N different transport-layer protocols, each associated with one of network devices 102, and switch 106 switches frames to network devices 102 using the transport-layer protocols. FIG. 8 shows a process 800 according to a preferred embodiment of the present invention. All of network devices 102 are associated with a single common predetermined IP address (step 802) according to conventional techniques. Each of network devices 102 is also associated with a different transport-layer protocol number (step 804) according to conventional techniques External interface 116 receives frames of data from external node 104 (step 806). Each frame of data comprises the single common predetermined IP address as a destination IP address and one of the transport-layer protocol numbers as a destination transport-layer port number. Preferably processor 120 of external node 104 executes an application that binds to the transport-layer protocol numbers associated with network devices 102.

Forwarding engine 118 transfers each of the frames of data to the internal interface 114 in communication with the network device 102 associated with the transport-layer protocol number of the frame of data (step 808). Internal interfaces 114 transmit the frames of data to the respective network devices 102 (step 810), which receive the frames.

Network devices 102 can also transmit frames of data. Each network device 102 transmits frames of data comprising the single common predetermined IP address as a source address and the respective transport-layer protocol numbers as a source transport-layer port number (step 812). Internal interfaces 114 receive the frames of data (step 814). Forwarding engine 118 transfers the frames of data to external interface 116 (step 816), which transmits the frames of data to external node 104 (step 818).

Referring now to FIGS. 9A-9E, various exemplary implementations of the present invention are shown.

Figure 9B:
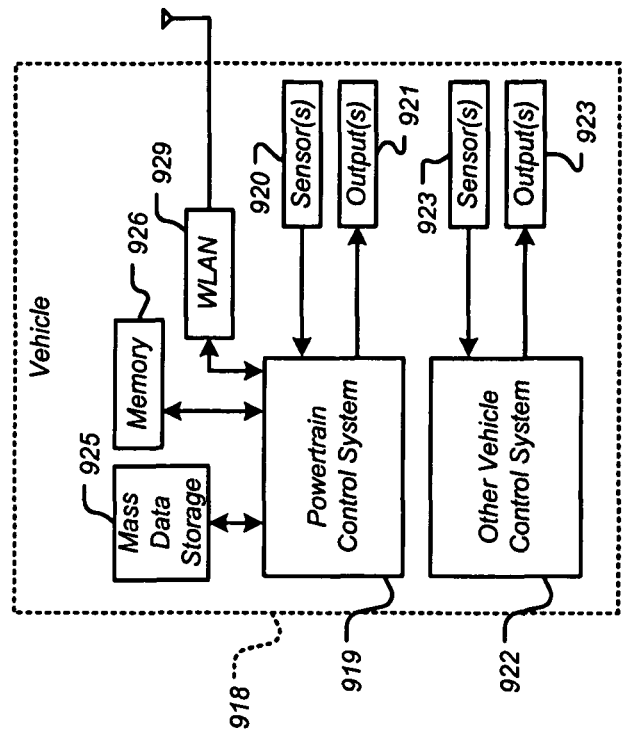
FIGS. 9A-9E show various exemplary implementations of the present invention.
Figure 9A:
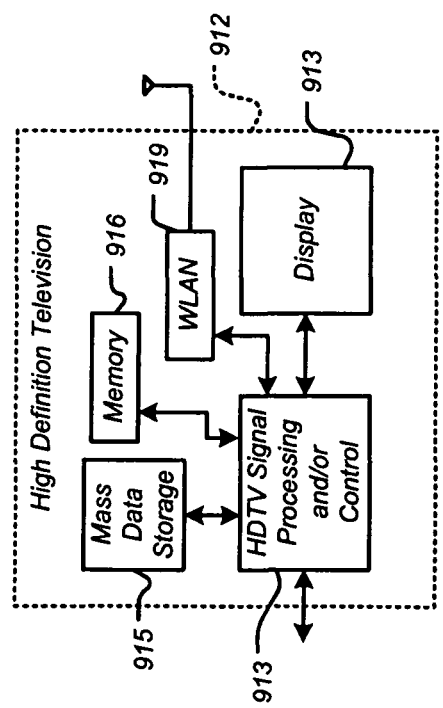

Referring now to FIG. 9A, the present invention can be implemented in a high definition television (HDTV) 912. The present invention may implement either or both signal processing and/or control circuits, which are generally identified in FIG. 9A at 913, a WLAN interface and/or mass data storage of the HDTV 912. The HDTV 912 receives HDTV input signals in either a wired or wireless format and generates HDTV output signals for a display 914. In some implementations, signal processing circuit and/or control circuit 913 and/or other circuits (not shown) of the HDTV 912 may process data, perform coding and/or encryption, perform calculations, format data and/or perform any other type of HDTV processing that may be required.

The HDTV 912 may communicate with mass data storage 915 that stores data in a nonvolatile manner such as optical and/or magnetic storage devices. The HDD may be a mini HDD that includes one or more platters having a diameter that is smaller than approximately 1.8". The HDTV 912 may be connected to memory 916 such as RAM, ROM, low latency nonvolatile memory such as flash memory and/or other suitable electronic data storage. The HDTV 912 also may support connections with a WLAN via a WLAN network interface 917.

Referring now to FIG. 9B, the present invention implements a control system of a vehicle 918, a WLAN interface and/or mass data storage of the vehicle control system. In some implementations, the present invention implements a powertrain control system 919 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 922 of the vehicle 918. The control system 922 may likewise receive signals from input sensors 923 and/or output control signals to one or more output devices 924. In some implementations, the control system 922 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 919 may communicate with mass data storage 925 that stores data in a nonvolatile manner. The mass data storage 925 may include optical and/or magnetic storage devices for example hard disk drives HDD and/or DVDs. The HDD may be a mini HDD that includes one or more platters having a diameter that is smaller than approximately 1.8". The powertrain control system 919 may be connected to memory 926 such as RAM, ROM, low latency nonvolatile memory such as flash memory and/or other suitable electronic data storage. The powertrain control system 919 also may support connections with a WLAN via a WLAN network interface 927. The control system 922 may also include mass data storage, memory and/or a WLAN interface (all not shown).

Figure 9C:
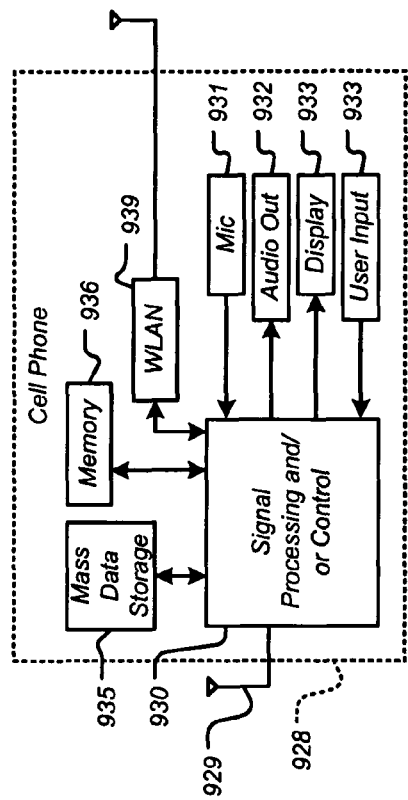

Referring now to FIG. 9C, the present invention can be implemented in a cellular phone 928 that may include a cellular antenna 929. The present invention may implement either or both signal processing and/or control circuits, which are generally identified in FIG. 9C at 930, a WLAN interface and/or mass data storage of the cellular phone 928. In some implementations, the cellular phone 928 includes a microphone 931, an audio output 932 such as a speaker and/or audio output jack, a display 933 and/or an input device 934 such as a keypad, pointing device, voice actuation and/or other input device. The signal processing and/or control circuits 930 and/or other circuits (not shown) in the cellular phone 928 may process data, perform coding and/or encryption, perform calculations, format data and/or perform other cellular phone functions.

The cellular phone 928 may communicate with mass data storage 935 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 928 may be connected to memory 936 such as RAM, ROM, low latency nonvolatile memory such as flash memory and/or other suitable electronic data storage. The cellular phone 928 also may support connections with a WLAN via a WLAN network interface 937.

Figure 9D:
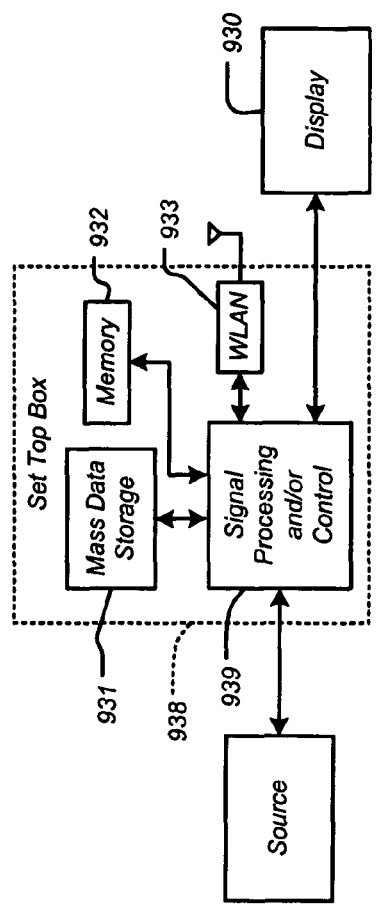

Referring now to FIG. 9D, the present invention can be implemented in a set top box 938. The present invention may implement either or both signal processing and/or control circuits, which are generally identified in FIG. 9D at 939, a WLAN interface and/or mass data storage of the set top box 938. The set top box 938 receives signals from a source such as a broadband source and outputs standard and/or high definition audio/video signals suitable for a display 940 such as a television and/or monitor and/or other video and/or audio output devices. The signal processing and/or control circuits 939 and/or other circuits (not shown) of the set top box 938 may process data, perform coding and/or encryption, perform calculations, format data and/or perform any other set top box function.

The set top box 938 may communicate with mass data storage 943 that stores data in a nonvolatile manner. The mass data storage 943 may include optical and/or magnetic storage devices for example hard disk drives HDD and/or DVDs. The HDD may be a mini HDD that includes one or more platters having a diameter that is smaller than approximately 1.8". The set top box 938 may be connected to memory 942 such as RAM, ROM, low latency nonvolatile memory such as flash memory and/or other suitable electronic data storage. The set top box 938 also may support connections with a WLAN via a WLAN network interface 943.

Figure 9E:
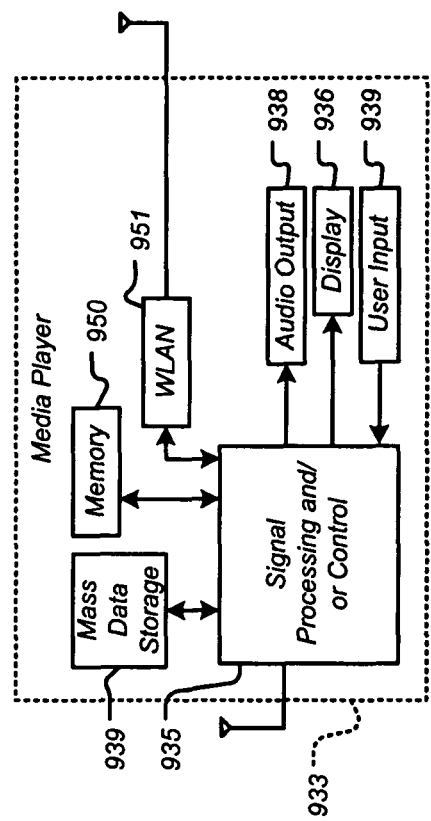

Referring now to FIG. 9E, the present invention can be implemented in a media player 944. The present invention may implement either or both signal processing and/or control circuits, which are generally identified in FIG. 9E at 945, a WLAN interface and/or mass data storage of the media player 944. In some implementations, the media player 944 includes a display 946 and/or a user input 947 such as a keypad, touchpad and the like. In some implementations, the media player 944 may employ a graphical user interface (GUI) that typically employs menus, drop down menus, icons and/or a point-and-click interface via the display 946 and/or user input 947. The media player 944 further includes an audio output 948 such as a speaker and/or audio output jack. The signal processing and/or control circuits 945 and/or other circuits (not shown) of the media player 944 may process data, perform coding and/or encryption, perform calculations, format data and/or perform any other media player function.

The media player 944 may communicate with mass data storage 949 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 944 may be connected to memory 950 such as RAM, ROM, low latency nonvolatile memory such as flash memory and/or other suitable electronic data storage. The media player 944 also may support connections with a WLAN via a WLAN network interface 951. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as first hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as first hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system, comprising:
   a plurality of network devices configured to transmit first frames of data to an external node; and
   a switch comprising
      a plurality of first interfaces, each in communication with one of the network devices, configured to receive the first frames of data from the network devices,
      a hardware processor configured to negotiate with the external node to select, for each of the network devices, a transport-layer port number that is not associated with any others of the network devices, wherein all of the network devices are associated with a common predetermined internet protocol (IP) address, and wherein each of the first frames of data transmitted by the plurality of network devices comprises (i) the common predetermined IP address as a source IP address and (ii) a respective one of the selected transport-layer port numbers as a source transport-layer port number, and
      a second interface configured to transmit the first frames of data from the switch to the external node, wherein the external node is external to the switch.

2. The system of claim 1, further comprising a forwarding engine configured to transfer the first frames of data from the first interfaces to the second interface.

3. The system of claim 1, wherein the hardware processor assigns the selected transport-layer port numbers to the network devices.

4. The system of claim 1, wherein
   a plurality of predetermined transport-layer port numbers is assigned to each of the network devices,
   none of the predetermined transport-layer port numbers is associated with more than one of the network devices, and
   the hardware processor is configured to negotiate with the external node to select, for each of the network devices, one of the predetermined transport-layer port numbers assigned to each of the network devices.

5. The system of claim 4, wherein the plurality of predetermined transport-layer port numbers is assigned to each of the network devices before the hardware processor negotiates with the external node.

6. The system of claim 1, wherein
   the second interface is configured to receive second frames of data, wherein each of the second frames of data comprises (i) the common predetermined IP address as a destination IP address and (ii) one of the selected transport-layer port numbers as a destination transport-layer port number, and
   the switch is configured to transfer each of the second frames of data to one of the first interfaces based on the one of the selected transport-layer port numbers.

7. The system of claim 1, further comprising:
   a memory configured to store associations between (i) the network devices and (ii) the selected transport-layer port numbers.

8. The system of claim 1, wherein
   The hardware processor is configured to
      create a sequenced communication session with the external node, wherein each frame in the sequenced communication session comprises a sequence number, and
      hand off control of the sequenced communication session to one of the network devices, and
   the one of the network devices is configured to continue the sequenced communication session with the external node.

9. The system of claim 8, wherein the hardware processor is configured to inform the one of the network devices of a most recent sequence number associated with the sequenced communication session.

10. A method, comprising:
    transmitting first frames of data from a plurality of network devices to an external node;
    receiving, using a switch including a plurality of first interfaces, the first frames of data from the network devices;
    using a hardware processor, negotiating with the external node to select, for each of the network devices, a transport-layer port number that is not associated with any others of the network devices, wherein all of the network devices are associated with a common predetermined internet protocol (IP) address, and wherein each of the first frames of data transmitted by the plurality of network devices comprises (i) the common predetermined IP address as a source IP address and (ii) a respective one of the selected transport-layer port numbers as a source transport-layer port number; and
    transmitting the first frames of data to the external node, wherein the external node is external to the switch.

11. The method of claim 10, further comprising assigning the selected transport-layer port numbers to the network devices.

12. The method of claim 10, further comprising:
    assigning a plurality of predetermined transport-layer port numbers to each of the network devices, wherein none of the predetermined transport-layer port numbers is associated with more than one of the network devices; and
    negotiating with the external node to select, for each of the network devices, one of the predetermined transport-layer port numbers assigned to each of the network devices.

13. The method of claim 12, further comprising assigning the plurality of predetermined transport-layer port numbers to each of the network devices before the hardware processor negotiates with the external node.

14. The method of claim 10, further comprising:
    receiving second frames of data, wherein each of the second frames of data comprises (i) the common predetermined IP address as a destination IP address and (ii) one of the selected transport-layer port numbers as a destination transport-layer port number; and
    transferring each of the second frames of data to the network devices based on the one of the selected transport-layer port numbers.

15. The method of claim 10, further comprising:
    storing associations between (i) the network devices and (ii) the selected transport-layer port numbers.

16. The method of claim 10, further comprising:
    using the hardware processor, creating a sequenced communication session with the external node, each frame in the sequenced communication session comprising a sequence number;
    handing off control of the sequenced communication session to one of the network devices; and using the one of the network devices, continuing the sequenced communication session with the external node.

17. The method of claim 16, further comprising informing the one of the network devices of a most recent sequence number associated with the sequenced communication session.

\* \* \* \* \*